UNITED STATES PATENT OFFICE.

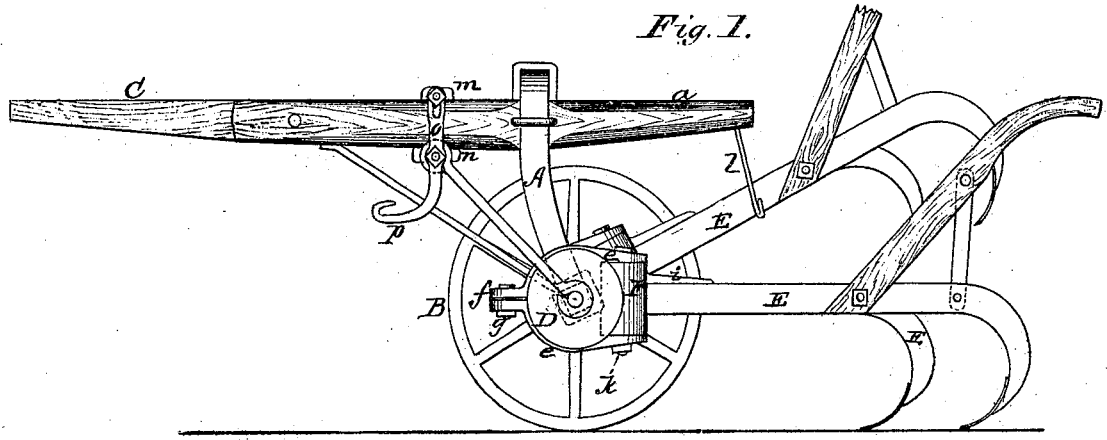
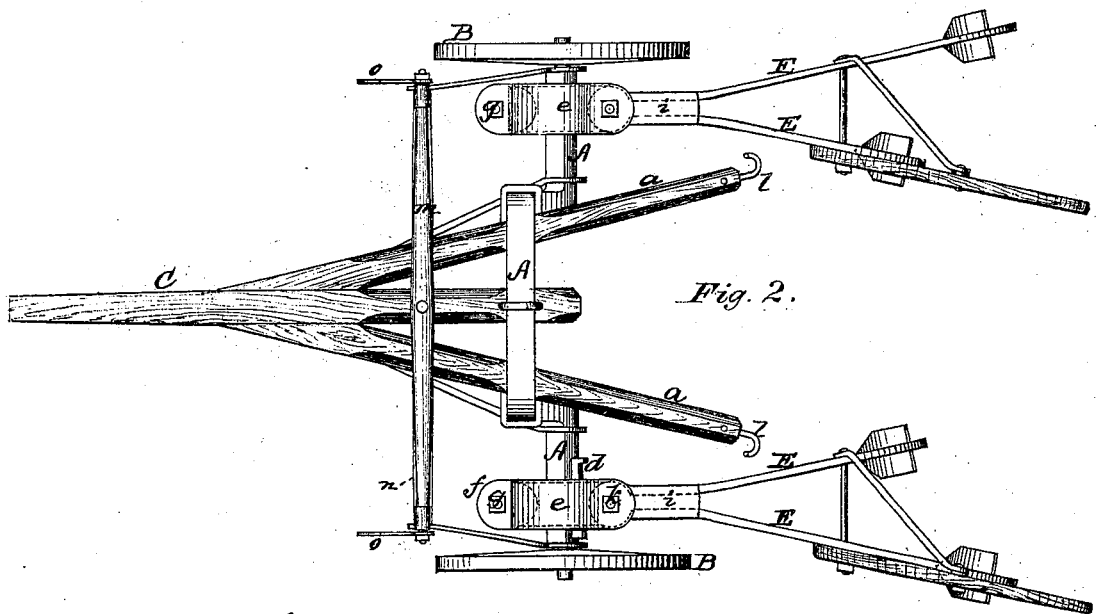
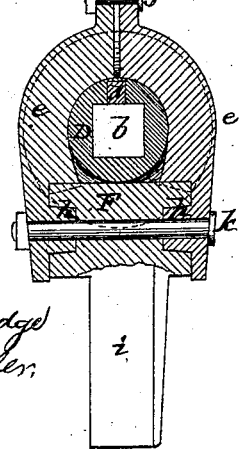
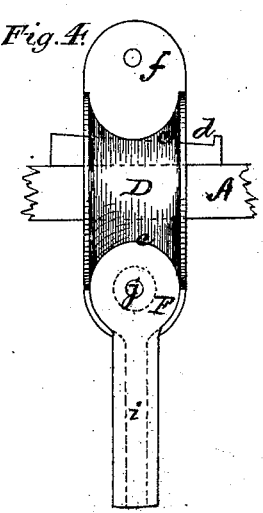
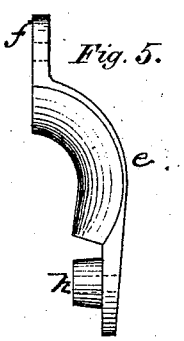

JOHN VANLUVANEE AND HUGH SMITH, OF MOLINE, ILLINOIS.

IMPROVEMENT IN WALKING-CULTIVATORS.

Specification forming part of Letters Patent No. 112,990, dated March 21, 1871.

*To all whom it may concern:*

Be it known that we, JOHN VANLUVANEE and HUGH SMITH, of Moline, in the county of Rock Island and State of Illinois, have invented certain Improvements in Walking-Cultivators, of which the following is a specification, reference being had to the accompanying drawings.

Our invention relates to that class of walking-cultivators which consist of a frame mounted on two wheels, with the cultivator-beams connected to the axles and drawn behind, and which are operated by attaching the horses to the frame, while the operator walks behind the machine and guides the cultivator by hand.

The invention consists in an improved joint or coupling for connecting the cultivator-beams to the axle.

Figure 1 is a side elevation of our cultivator, with the farther plow hooked up on the frame or hounds and the near wheel removed. Fig. 2 is a top plan view of the cultivator. Fig. 3 is a longitudinal vertical section through the center of the coupling; Fig. 4, a top plan view of the coupling with the upper outside band removed; and Fig. 5 is a view of said band.

A is the axle, made of a single bar of square iron arched or bowed upward at its middle, and rounded at its extreme ends to receive the wheels B B.

C is the tongue, which is provided with the diverging arms or hounds $a$, and secured firmly to the upper arched portion of the axle. The arched portion of the axle is bent or inclined forward, as shown in Figs. 1 and 2, so that the weight of the frame is thrown forward of the axles of the wheels, for a purpose hereinafter described.

On each axle, inside of the wheel, is slipped a round block or hub, D, having a square hole, $b$, through its center to fit the axle, and a semi-circular groove, $c$, encircling its periphery, as shown in Figs. 1, 2, 3, and 4.

Each hub is provided with a groove in one side of the opening $b$, and fastened in place by a key or wedge, $d$, driven into the said groove. By loosening the key $d$ the hub is released, and may then be moved laterally on the axle and fastened at any desired point by tightening up the key again.

Around each hub is placed a U-shaped clasp, consisting of two curved metal pieces, $e$, Fig. 5, which are rounded on their inner faces to fit the hub, and provided at their front ends with ears $f$, through which a bolt, $g$, is passed to hold them together, as shown in Fig. 3. The pieces $e$, when applied, fit into the grooved face of the hub and about half encircle the same. The two ends of the pieces $e$ which are not connected extend out behind the hub parallel with each other, and are each provided with a round stud, $h$, on its inner face, the studs on the two pieces being in the same vertical line, and having a hole made down through their centers, as shown.

The beams E, to which the shovels are attached, are arranged in pairs in the usual manner, and secured at their front ends to opposite sides of an arm, $i$, which is formed on one side of a cylindrical head, F, as shown in Figs. 1 and 2. The cylindrical head F stands vertically, and is made of the proper size and form to fit between the rear ends of the pieces $e$ and into the groove of the hub, and it is also provided in its ends with recesses to receive the studs $h$, and with a hole, $j$, vertically through its center.

The beams are attached to the axle by placing the head F against the rear side of the hub, and applying the pieces $e$ to opposite sides of the latter, with their studs $h$ fitted into the recesses in the head, and then fastening the parts together by bolts $g$ and $k$, the former being passed through the ears $f$ and the latter through studs $h$ and head F, as shown in Fig. 3. In this manner the beams are coupled strongly to the axles and held in an upright position, while at the same time they are allowed a free vertical and lateral movement. The lateral swinging motion of the beams is permitted by the head F turning between the pieces $e$ around studs $h$, and the vertical movement by the pieces $e$ and head F turning around the grooved hub.

By tightening the bolts $g$ and $k$ any wear of the parts may be compensated for, and the joint thus kept tight and in working order.

The shovels are secured to the beams by any suitable fastening, and the beams are provided with the customary handles by which to manage and guide them.

The rear ends of the hounds or arms $a$ are provided with hooks $l$, on which the beams are suspended in going to and from the field, as in the machines now in use. In this class of machines as ordinarily constructed, where the frame is nearly balanced on the wheels, when the beams were hooked up their weight tended to throw up the front end of the tongue with considerable force, and thus brought a very troublesome and annoying strain on the necks of the horses; but in our machine, the weight of the frame being thrown forward of the center of the wheels, it serves to counterbalance the weight of the beams when they are suspended on arms *a*, and thus the upward tendency of the tongue is avoided.

To the upper side of the tongue is pivoted a vibrating bar, *m*, and to the under side of the tongue, below this bar, is secured a rigid bar, *n*, of equal length therewith. To each end of the bar *n* is pivoted a lever, *o*, the upper end of which is slotted and connected to bar *m* by a pin or bolt passing through said slot. The lower ends of arms *o* project below the bar *n* a considerable distance, and are fashioned into hooks *p*, to which the whiffletrees are attached. By this arrangement the line of draft is brought much lower than usual, and as a consequence the downward strain of the tongue on the necks of the horses materially lessened. The vibrating bar also serves as an equalizer for distributing the strain or draft equally on the two horses.

It will be observed that the hub D is of unusual diameter in proportion to the other parts, and that the groove in it is very deep, and that the head F is of nearly double the usual length, or much longer than the beams are wide. This construction of parts makes a joint which, while permitting a free vertical and lateral movement of the shovels, at the same time prevents any torsional play in the joint, and thereby holds the shovels securely in an upright position. This is a very important feature in this class of implements, because, as generally made, the shovels are apt to tip more or less sidewise, and in so doing are apt to cut up the plants in the rows.

Having described our invention, what we claim is—

The combination of the grooved hub D, made adjustable on the axle A, with the circular T-head F secured to the hub by means of the segmental clamps *e*, substantially as set forth.

JOHN VANLUVANEE.
HUGH SMITH.

Witnesses:
W. L. CARROLL,
B. W. GARTSIDE.